United States Patent Office 2,906,791
Patented Sept. 29, 1959

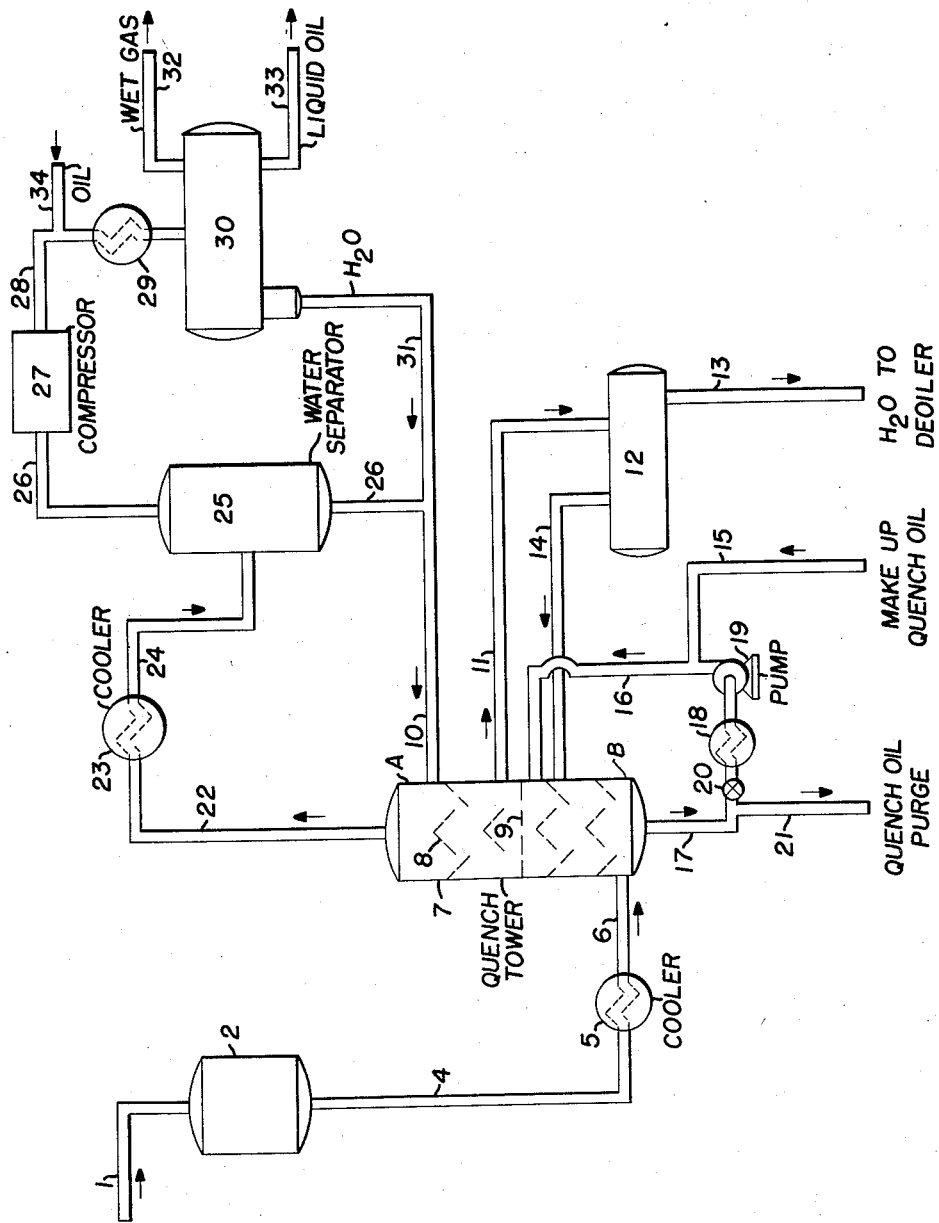
George P. Baumann
Earle A. Nirmaier
Inventors

2,906,791

BUTENE DEHYDROGENATION FOLLOWED BY OIL AND WATER QUENCHING OF THE DEHYDROGENATION PRODUCT EFFLUENT

George P. Baumann, Metuchen, and Earle A. Nirmaier, Maplewood, N.J., assignors to Esso Research and Engineering Company, a corporation of Delaware Application March 6, 1957, Serial No. 644,338

5 Claims. (Cl. 260—680)

This invention relates generally to novel, improved quench systems for high temperature reactions which require low hydrocarbon partial pressure and large amounts of steam. This invention will find particular application to butadiene manufacture by dehydrogenation of $C_4$ hydrocarbons.

For the purpose of setting forth this invention with clarity reference will be had to butene dehydrogenation although it is to be understood that other reaction mechanisms will reap benefits from the present improved quench system. In the dehydrogenation of butene to butadiene at present a popular commercial method which yields extremely satisfactory results comprises passing crude butene feed together with large excess volumes of steam through a catalyst bed of a type which will not be adversely affected by the steam. A Dow catalyst which comprises as its essential ingredient calcium nickel phosphate is extremely well suited for this reaction. This type of catalyst is amply described in the following patents: U.S. 2,442,319, U.S. 2,442,320 and U.S. 2,456,367, all to Britton et al. The dehydrogenation reaction is carried out at elevated temperatures in the range of about 1000° to 1300° F. and at slightly elevated pressures. Due to the high temperatures employed and the unsaturated nature of the feed stock there is found a great deal of polymer and tar formation within the system. These contaminants form readily as the reaction product effluent leaves the reactor at elevated temperatures and is not in contact with dehydrogenation catalyst. It is this polymer and tarry material which in the past have caused considerable difficulties in butene dehydrogenation as well as similar systems. The prior art has found that this type of reaction system requires for satisfactory operation a double quench, the first being designed to quickly reduce the temperature of the reactor effluent so that side reactions which occur at elevated temperautres in the absence of catalyst will be inhibited and further to remove the tarry material and polymer. This first quench employs an oil such as a catalytically cracked fraction boiling from about 500° to 660° F., the particular one depending on the conditions within the quench tower, e.g. temperature and pressure. The second quench which employs water as the quench medium is designed to further reduce temperature and condense most of the remaining non-product or heavier gases such as steam, $C_{5+}$ oil including the high molecular weight polymer and tar. Also carbonyls are removed by the water. In such a double quench system to operate efficiently it has previously been found necessary to recycle quench water taken as bottoms from the water quench tower for economic reasons.

The initial oil quench does not effectively remove all of the polymer from the system. Normally the gaseous effluent from the oil quench is first passed through a cooler, which unavoidably agitates the mixture and the cooled effluent is then passed to the water quench tower. Since the oil quench tower gaseous effluent in the past has contained appreciable quantities of polymer and heavy tars, emulsions were found to exist in the lines, coolers, pumps, etc., thereby causing fouling difficulties. Further higher molecular weight polymer has been found to build up in amounts sufficient to cause blocking and necessitate frequent periodic shutdowns in order to clean the system. The water quench tower in the prior art wherein water is recycled from the bottom to the top of the tower requires some pumping means. Here again it is obvious that these pumps aggravate the already present tendency for emulsification. There has also been difficulty in separating oil from the water since considerable oil is carried over and is emulsified by the pumps and other equipment, the emulsion being extremely difficult to break.

It has now been found that by employing a particular novel type quench process the above and other difficulties are avoided.

Referring to the drawing, there is depicted a simplified flow diagram of the present improved process, emphasizing the instant novel quench system. Again for the sake of clarity reference will be had to a typical butene dehydrogenation operation.

20,000 to 80,000 lbs./hr. of a crude butene-containing hydrocarbon stream wherein one typical representative analysis follows:

| Component: | Moles |
|---|---|
| $C_3^=$ | 0.5 |
| iso $C_4$ | 81.9 |
| iso $C_4^=$ | 12.3 |
| n $C_4^=$ | 517.1 |
| n $C_4$ | 109.8 |
| $C_4^{\equiv}$ | 0.3 |
| $C_5+$ | 2.8 | are passed with 80,000 to 320,000 lbs./hr. of superheated steam at a temperature of about 1000° to 1250° F. through line 1 to butene dehydrogenator 2. The preferred weight ratio of steam to crude butene feed may vary between 6 and 9½:1. This would amount to about 14 and 22:1 volume ratios of steam to butene. Reactor 2 may comprise a bed of nickel calcium phosphate of the following typical composition:

| Component | General | Specific |
|---|---|---|
| Ni | 4.3 to 5.5 | 5 |
| Ca | 27.8 to 32.0 | 30 |
| $PO_4^{\equiv}$ | 49.0 to 60.5 | 57 |
| $Cr_2O_3$ | 1.0 to 8.0 | 6 |
| Lubricant | 1.0 to 3.0 | 2 |

Of course alternate dehydrogenation catalysts may be employed if desired. Some of the more typical are those containing large amounts of MgO as a base and smaller amounts of active dehydrogenating compounds such as the oxides of iron, chromium, cobalt and nickel. This type of catalyst usually includes a basic promoter such as the oxides of sodium, potassium, lithium, calcium, barium and the like. If desired the base may be omitted. The catalyst chosen must not be deleteriously affected by steam, steam being a necessary adjunct to this dehydrogenation process.

The reactor 2 exit temperature is maintained at 925° to 1250° F. with a pressure of 2 to 10 p.s.i.g. Reactor effluent is passed via line 4 through heat exchange cooler 5 wherein temperatures are dropped to about 450° to 700° F. at 1 to 9 p.s.i.g. The partially cooled reaction vapors are fed via line 6 into a combination quench tower 7 comprising two zones, upper zone A and lower zone B. Both zones are preferably substantially the same, having baffles 8 separated by a screen 9. Both zones in tower 7 may contain the same or different types of liquid-gas contacting aids such as the shed type baffles as shown, the disc and donut type or others.

In zone A gaseous product which has been quenched and scrubbed with oil in zone B is further scrubbed with water to remove additional polymer. Cooling water at approximately 90° to 200° F. is fed to an intermediate or upper portion of zone A via line 10 in a water to feed weight ratio of .5–2:1. The water together with any steam that is condensed, heavier oils, polymers and carbonyls are removed from a lower portion of zone A via line 11 and passed to oil-water separator 12. Water with small amounts of oil is removed from separator 12 via line 13 and passed to any conventional type of deoiler from which the oil may be recovered. The oil layer may be passed from separator 12 to zone B via line 14 to aid in the quenching and removal of polymer. A good separation of oil and water is made between zones A and B and substantially no water is permitted to pass downwardly through screen 9 and enter zone B since the temperature in zone A near the screen 9 is above the boiling point of water. Instead of screen 9 a layer of Raschig rings, Berl saddles or just space may be employed to separate the two zones. The main function of separator 9 is to enhance the removal of entrained liquid such as quench oil so that it does not reach zone A. Thus a clean separation of oil from water is aided by separator 9.

Concomitantly quench oil which may comprise any saturated or unsaturated oil having an initial boiling point above the highest temperature in zone B is admitted via line 15 and passed with recycle quench oil via line 16 in an amount of 350,000 to 900,000 to the upper portion of zone B, the temperature of stream being from 140° to 230° F. The downward flow of quench oil serves to initially absorb polymer from the reactor effluent gases. Quench oil containing the polymer is taken from zone B of quench tower 7 as a bottoms stream via line 17, cooled at 18 and recycled to the upper portion of zone B by pump 19. Build-up of quench oil in the system may be prevented by a continuous quench oil purge through valve 20 and line 21. Thus dehydrogenation reactor effluent containing polymers is both oil and water quenched without the use of pipes, pumps or any restricted areas which might be blocked or fouled. Gaseous effluent from the combination quench tower 7 is passed overhead via line 22 to a cooler, such as the air-finned type, 23, wherein the effluent is cooled to 90° to 150° F. thence through 24 to a knockout drum or water separator 25. Water condensers or other types of coolers may be employed instead of or in conjunction with the air-finned coolers depicted in the drawing. Separated water may then be recycled by gravity flow through lines 26 and 10 to the upper portion of zone A. Although only one water separator is disclosed it is to be understood that a plurality of water separators and heat exchange coolers may be employed. In any event the gaseous effluent separated from the water is passed overhead from separator 25 via line 26 to compressor 27, line 28, cooler 29, eventually to separator 30. Quench oil may be added via line 34 to aid in cooling the compressed gases and to entrain additional product. Any small amounts of water which may have been entrained up to this point are removed from separator 30 via line 31 and may be recycled if desired to the combination quench tower. The temperature of reaction product fed to separator 30 may be from 75° to 150° F. at 120 to 300 p.s.i.g. From separator 30 wet gases comprising principally hydrogen with minor amounts of hydrocarbon and other gases are taken overhead via line 32 and liquid oil product comprising butadiene which may also contain some other hydrocarbons is removed via line 33. This product may then be treated in any conventional manner to recover butadiene product of high purity. In general the liquid oil recovered via line 33 is first sent to a depropanizer, then to subsequent treating stages.

*Example*

A crude butene containing stream having the approximate composition described above is introduced into the dehydrogenator reactor at the rate of 42,000 lbs./hr. with about 185,000 lbs./hr. of steam at a temperature of 1200° F. The Dow type catalyst of the composition recited above is employed in the form of a bed in reactor 2. Volume ratio of steam to butene is about 20:1. Pressures within reactor 2 are maintained at 14 p.s.i.g. at the inlet and 6 p.s.i.g. at the outlet. Reactor effluent which is at a temperature of 1175° F. is passed via line 4 through heat exchange cooler 5 wherein the temperature is reduced to about 500° F. at a pressure of 3 p.s.i.g. At this temperature and pressure the reaction product effluent is fed into a lower portion of the combination oil-water quench tower such as depicted in the drawing. Quench oil comprising a petroleum oil having an initial boiling point of about 500° F. is fed into the upper portion of zone B at about 658,000 lbs./hr. at a weight ratio of quench oil to feed of about 3:1. The quench oil employed in this example has the following composition: 20° A.P.I., 6.5 centistokes at 100° C. and 0.58 centisoke at 400° C. The boiling range is 525° F. to 660° F. In this initial zone B the quench oil is fed in at about 186° F. The rising gaseous product effluent is quickly reduced in temperature from 500° F. to about 250° F. by the time it reaches separator 9 which comprises a crinkle mesh screen. The pressure at the bottom portion of the quench tower was maintained at about 3 p.s.i.g. and substantially no quench oil is permitted to rise to the upper quench zone A. The gaseous effluent now free from a substantial portion of the polymers and other heavy material is then passed through screen 9 into a second quench zone A. Water is introduced via line 10 at about 166° F. in amount sufficient to maintain the temperature of the reaction product effluent taken overhead via line 22 at about 213° F. In this embodiment about 181,000 lbs./hr. of water were pumped in, representing a weight ratio of water to reaction product of about 4:1. Approximately 185,000 lbs. of water were removed from the upper zone via line 11, the difference representing the amount of steam condensed together with minor proportions of intermediate and higher molecular weight hydrocarbons. Most of the remaining polymer is removed via line 11 with the water which is passed to separator 12. Thus a clean separation between the oil and water is obtained. Product effluent from the double quench tower was first passed through an air-fin cooler wherein the temperature was dropped to about 100° F. From the cooler the product is sent to a drum wherein water is separated via line 26 and recycled to zone A of the quench tower. The overhead gaseous effluent is passed to a compressor 27 where the hydrocarbons are compressed to about 145 p.s.i.g. The effluent from the compressor which is now at a temperature of about 215° F. and a pressure of 145 p.s.i.g. is condensed by heat exchange means 29. Also light $C_{5+}$ oil was added via line 34 for the purpose of absorbing some of the light hydrocarbons present. The compressed gas and the vapor condensed in cooler 29 are now at a temperature of about 90° F. and a pressure of 145 p.s.i.g. The separation is made from tank 30 between liquid oil containing buttadiene product and wet gas which comprises principally hydrogen with minor amounts of carbon monoxide, carbon dioxide and hydrocarbons.

The principal advantages of this invention are:

(1) The efficient removal of polymer and other high molecular weight tarry material;

(2) The prevention of fouling within the heat exchange equipment, pumps, pipes and the like;

(3) The reduction in the amount of apparatus necessary for both the oil and water quenching operations;

(4) The elimination of water recirculation pumping and consequent formation of a tight emulsion, effecting easier recovery of oil free process water.

While this invention has been described in terms of butadiene product quenching immediately following the dehydrogenation of butenes, it is to be understood that this novel double quench system is applicable to the quenching of any gaseous product rapidly and immediately after its formation.

What is claimed is:

1. In a reaction system wherein low hydrocarbon partial pressures are employed in conjunction with excess amounts of steam and wherein gaseous reaction product effluent which contains polymer and other emulsion forming contaminants is quenched to lower the temperature and to remove emulsion forming contaminants, the improvement which comprises passing said gaseous reaction product effluent containing said emulsion forming contaminants and steam at elevated temperatures into a lower section of a quench zone, said quench zone comprising an upper and lower section separated by means for preventing entrained liquids from passing to said upper section of the quench zone, passing quench oil into the upper part of said lower section, contacting the ascending gaseous product with the downward flow of said quench oil whereby the temperature of said gaseous product is reduced and some of said contaminants are removed, passing gaseous product having a reduced emulsion forming contaminant content and being substantially freed from entrained liquid into the upper section of said quenching zone, introducing water into said upper section to effect additional cooling and to remove additional emulsion forming contaminants maintaining the lower zone at a temperature above the boiling point of water, recovering overhead crude gaseous reaction product and water vapor from said quench zone, separating and recycling condensed water to said upper zone, said product being substantially freed from emulsion forming contaminants.

2. A process in accordance with claim 1, wherein quench water, emulsion forming contaminants and oil are withdrawn from said upper section and sent by gravity flow to an oil-water separator whereby emulsifying is inhibited.

3. In the dehydrogenation of butene to butadiene in the presence of large amounts of steam, wherein reaction product effluent is quenched first with oil to lower the temperature and remove emulsion-forming contaminants, then quenched with water to further lower the temperature and remove additional emulsion forming contaminants, the improvement which comprises passing dehydrogenation product effluent containing steam and emulsion-forming contaminants into a lower zone of a quench tower comprising an upper and lower zone, contacting the ascending reaction product effluent in said lower zone with a downward flow of quench oil having an initial boiling point above the temperature of the incoming gaseous reaction product maintaining said lower zone at a temperature above the boiling point of water, withdrawing from said lower zone quench oil containing some of the emulsion-forming contaminants, passing gaseous reaction product effluent upwardly in the absence of entrained liquid quench oil into said upper zone, contacting said reaction product effluent in said upper zone with a downward flow of water at reduced temperatures whereby additional emulsion-forming contaminant is removed, withdrawing reaction product effluent having a substantially reduced emulsion forming contaminant content from said upper zone, said reaction product effluent also containing water vapor, recycling condensed water to said upper zone and finally recovering crude butadiene product.

4. A method in accordance with claim 3 wherein said reaction product effluent which is withdrawn from the quench tower is cooled to effect a separation of water from liquid oil and wherein said water is recycled to the upper zone of said quench tower by gravity flow.

5. A process for quenching gaseous butadiene reaction product effluent containing large amounts of steam and emulsion-forming contaminants which comprises passing said reaction product effluent upwardly through a lower section of a quench zone, passing quench oil downwardly through said lower section to contact the reaction product in a countercurrent manner whereby emulsion-forming contaminants are removed from said reaction product, withdrawing from the bottom of said lower section quench oil containing emulsion-forming contaminants and recycling a portion of said quench oil to said lower section, maintaining said lower section at a temperature above the boiling point of water passing gaseous reaction product containing a decreased amount of emulsion-forming contaminant from said lower section upwardly in the absence of entrained liquid quench oil into an upper section of said quench zone, contacting in said upper section the gaseous reaction product with a countercurrent flow of lower temperature water in an amount sufficient to decrease the temperature of said gaseous product and to pick up additional emulsion-forming contaminant, withdrawing from said upper section water containing emulsion-forming contaminant and condensed heavier oils, withdrawing overhead from said upper section gaseous reaction product and water vapor containing decreased emulsion-forming contaminant, cooling said reaction product effluent to separate water, recycling said separated water to said upper zone finally compressing and cooling the product to recover crude butadiene.

References Cited in the file of this patent

UNITED STATES PATENTS

| | | |
|---|---|---|
| 2,401,973 | Seyfried et al. | June 11, 1946 |
| 2,731,508 | Jahnig et al. | Jan. 17, 1956 |